United States Patent

Sadoi et al.

[11] Patent Number: 5,615,374
[45] Date of Patent: Mar. 25, 1997

[54] LOCK CONTROL METHOD FOR RESOURCE

[75] Inventors: Yasuhiko Sadoi; Masanobu Suzuki; Gunji Ogawa, all of Kawasaki, Japan

[73] Assignee: Fujitsu Limited, Kawasaki, Japan

[21] Appl. No.: 618,405

[22] Filed: Mar. 19, 1996

Related U.S. Application Data

[63] Continuation of Ser. No. 122,652, Sep. 17, 1993, abandoned.

[30] Foreign Application Priority Data

Sep. 25, 1992 [JP] Japan .................................. 4-256330

[51] Int. Cl.$^6$ .................................................. G06F 13/00
[52] U.S. Cl. .................................................. 395/726
[58] Field of Search ........................... 395/726, 650, 395/457, 474, 475

[56] References Cited

U.S. PATENT DOCUMENTS

| | | | |
|---|---|---|---|
| 4,480,304 | 10/1984 | Carr et al. | 395/725 |
| 4,574,350 | 3/1986 | Starr | 395/725 |
| 4,604,694 | 8/1986 | Hough | 395/650 |
| 5,109,511 | 4/1992 | Nitta et al. | 395/650 |
| 5,202,990 | 4/1993 | Saikawa | 395/650 |
| 5,226,143 | 7/1993 | Baird et al. | 395/425 |
| 5,251,318 | 10/1993 | Nitta et al. | 395/725 |
| 5,263,161 | 11/1993 | Barth et al. | 395/650 |
| 5,287,521 | 2/1994 | Nitta et al. | 395/725 |
| 5,305,448 | 4/1994 | Insulaco et al. | 395/425 |
| 5,307,483 | 4/1994 | Knipfer et al. | 395/575 |
| 5,317,749 | 5/1994 | Dahlen | 395/726 |
| 5,319,780 | 6/1994 | Catino et al. | 395/726 |
| 5,333,297 | 7/1994 | Lemaire et al. | 395/500 |
| 5,392,433 | 2/1995 | Hammersley et al. | 395/726 |

*Primary Examiner*—Ayaz R. Sheikh
*Attorney, Agent, or Firm*—Staas & Halsey

[57] ABSTRACT

In a lock control method for a system having a plurality of CPUs and a resource, identification information concerning one of CPUs is written into a non-class lock area of a first lock control information when there is no identification information in the first lock control information, so that the above CPU can acquire the right to exclusively use the whole resource. The identification information concerning one of the CPUs is written into the class lock area of the first lock control information, and thereafter the identification information concerning the CPU is written into a second lock control information when there is no identification information in a non-class lock area of the first lock control information, so that the CPU can acquire the right to exclusively use the resource for each of the classes thereof.

6 Claims, 9 Drawing Sheets

STATE 1 : ALL CPUs DO NOT HAVE LOCKS AT ALL

— EACH CPU CAN ACQUIRE NON-CLASS LOCK & CLASS LOCK

STATE 2 : THERE IS CPU WHICH HOLDS NON-CLASS LOCK

— NEITHER NON-CLASS LOCK NOR CLASS LOCK CAN BE ACQUIRED

STATE 3 : THERE ARE CPUs WHICH HOLD CLASS LOCK

STATE 1 : ALL CPUs DO NOT HAVE LOCKS AT ALL

— EACH CPU CAN ACQUIRE NON-CLASS LOCK & CLASS LOCK

STATE 2 : THERE IS CPU WHICH HOLDS NON-CLASS LOCK

— NEITHER NON-CLASS LOCK NOR CLASS LOCK CAN BE ACQUIRED

STATE 3 : THERE ARE CPUs WHICH HOLD CLASS LOCK

STATE OF REAL PAGE MANAGEMENT TABLE

LOCK CONTROL METHOD FOR RESOURCE

This application is a continuation of application Ser. No. 08/122,652, filed Sep. 17, 1993, now abandoned.

BACKGROUND OF THE INVENTION

1. Field of the Invention

The present invention relates to an exclusive-use (lock) control system that performs an exclusive-use (lock) control of resources in a computer system.

2. Description of the Related Art

Recently, there has been considerable activity in research and development directed toward improving the processing ability of the hardware system of a data processing device. For example, a tightly-connected multiprocessor (MP) system made up of eight CPUs (processors) has been proposed in order to improve the processing ability of the hardware system. As the processing ability of the hardware system is improved, a loss due to a collision between accesses to a resource commonly and serially used in the system increases in proportion to the number of CPUs (Central Processing Units). In order to eliminate the above problem, it is necessary to classify a serializing process into parts with respect to the common resource serially used among the CPUs and to reduce collisions among the CPUs as much as possible. However, all execution units in the system cannot cope with the classification of the common resource at one time. Accordingly, there are execution units necessary to serially use the common resource in the overall system. There is a requirement in which the common resource should be serially used in a state in which an execution unit that uses the common resource as a classified resource, and an execution unit that uses the common resource as a non-classified resource are mixed. Hence, it is desired that the common resource be classified under the condition in which requests for the serializing process are ensured.

Conventionally, a lock service is known for making it possible for various types of resources to be serially accessed. In the serializing process in the lock service, each CPU attempts to write a CPU identifier into an area (lock control area) to indicate acquirement of a lock by using a serializing instruction (for example, a compare and swap (CS) instruction) by hardware. A CPU which has successfully written the CPU identifier into the lock control area can exclusively own a common resource.

The lock service provides the following two types of locks regarding classification: a class lock and a non-class lock. The class lock is a classified lock based on an application. There are lock control areas for respective classes, and the lock can be acquired for each of the classes. The non-class lock is a non-classified lock, and there is a single lock control area as a whole. The lock for the whole resource can be acquired.

However, according to the conventional lock service, it is impossible to give a resource both a class lock and a non-class lock. That is, when a resource is classified, all execution units utilizing the resource in the system must correspond to the classification. Hence, execution units corresponding to the classification and execution units needing the serializing process in the whole system cannot coexist. Hence, it is impossible to satisfy a requirement in which an execution unit wishes to perform the serializing process for a resource by the class lock and another execution unit wishes to perform the serializing process for the above resource by the non-class lock. In such a case, the serializing process for the resource can be performed only by the non-class lock. Hence, a collision among CPUs may occur in the serializing process.

SUMMARY OF THE INVENTION

It is a general object of the present invention to provide a lock control method in which the above disadvantage is eliminated.

A more specific object of the present invention is to provide a lock control method capable of performing the serializing process for a resource by not only the non-class lock but also the class lock, whereby an unnecessary collision among CPUs can be prevented.

The above objects of the present invention are achieved by a lock control method for a system having a plurality of CPUs and a resource. The lock control method comprises the steps of writing identification information concerning the CPUs into first lock control information when each of the CPUs acquires a class lock or a non-class lock for the resource classified into classes, the first lock control information having a class lock area and a non-class lock area writing the identification information indicating the CPUs into second control information when each of the CPUs acquires locks for the classes writing the identification information concerning one of the CPUs into the non-class lock area of the first lock control information when there is no identification information in the first lock control information, so that the above one of the CPUs can acquire the right to exclusively use the whole resource; and writing the identification information concerning one of the CPUs into the class lock area of the first lock control information and writing the identification information concerning the above one of the CPUs into the second lock control information when there is no identification in the non-class lock area of the first lock control information, so that the above one of the CPUs can acquire the right to exclusively use the resource for each of the classes thereof.

BRIEF DESCRIPTION OF THE DRAWINGS

Other objects, features and advantages of the present invention will become more apparent from the following detailed description when read in conjunction with the accompanying drawings, in which:

FIG. 6 is a flowchart of a process for acquiring a class lock according to the embodiment of the present invention;

DESCRIPTION OF THE PREFERRED EMBODIMENTS

Figure 1A:
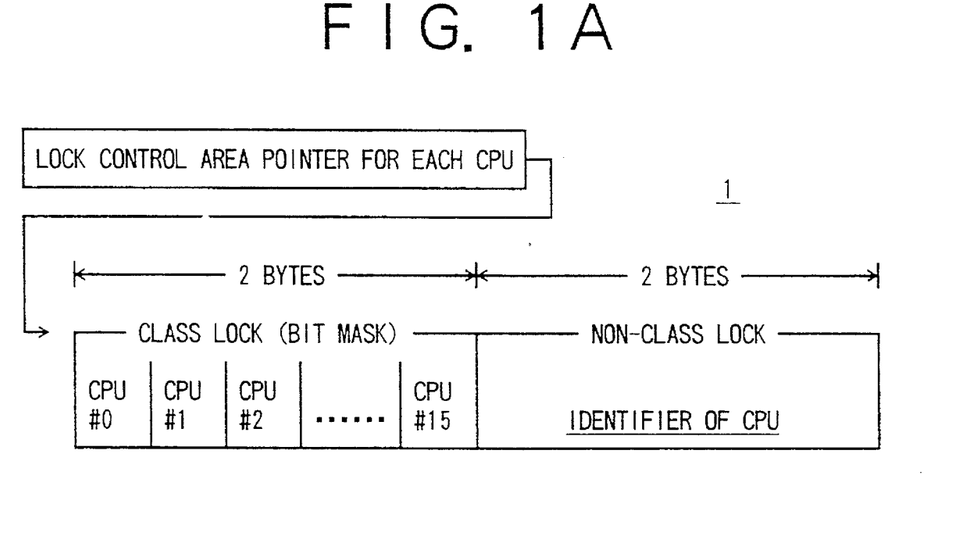
FIG. 1A is a diagram of a lock control information (CPU) used in an embodiment of the present invention.
Figure 1B:
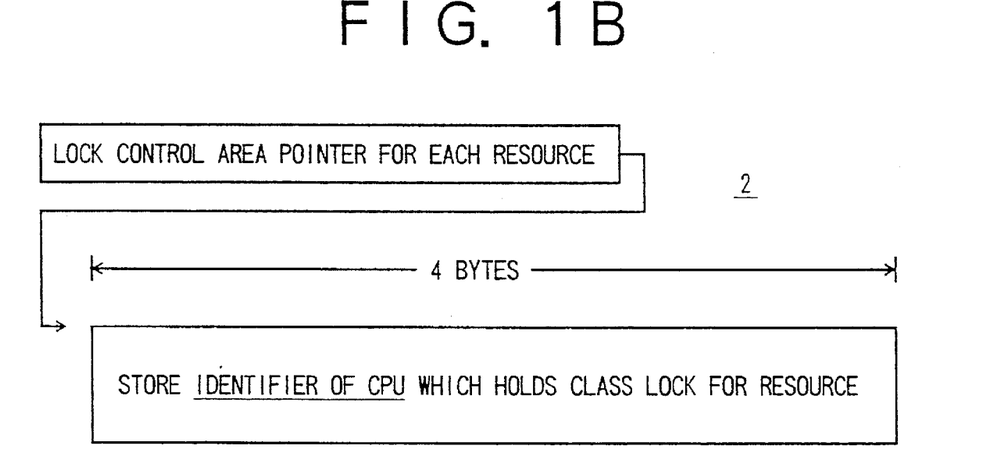
FIG. 1B is a diagram of a lock control information (resource) used in the embodiment of the present invention.

FIGS. 1A and 1B show the principle of the present invention. FIG. 1A shows lock control information (CPU) 1 having a class lock area and a non-class lock area, into which CPU identifiers (bits) of CPUs which have acquired the class lock and the non-class lock are written. FIG. 1B shows lock control information (resource) 2, into which CPU identifiers (bits) of CPUs which have acquired classes of a resource are written.

Referring to FIG. 1A, a CPU which has acquired the class lock is indicated by writing bit "1" into the corresponding bit position in the class lock area of the lock control information (CPU) 1. In FIG. 1A, a bit mask information of 16 bits (two bytes) respectively corresponding to 16 CPUs #0–#15 can be written into the class lock area of the lock control information (CPU) 1. The class lock is indicated by lock control area pointers respectively provided for the CPUs #0–#15. The identifier of a CPU which has acquired the lock for the whole resource can be written into the non-class lock area of the lock control information 1. In the above manner, bit "1" is written into the corresponding bit position in the class lock area when a CPU acquires the class lock, and the identifier of the CPU which has acquired the non-class lock is written into the non-class lock area.

Referring to FIG. 1B, the lock control information (resource) 2 is indicated by lock control information pointers respectively provided for resources. The identifier of a CPU which has acquired the class lock for the corresponding resource is written into the lock control information 2, so that exclusive use can be acquired.

Figure 2:
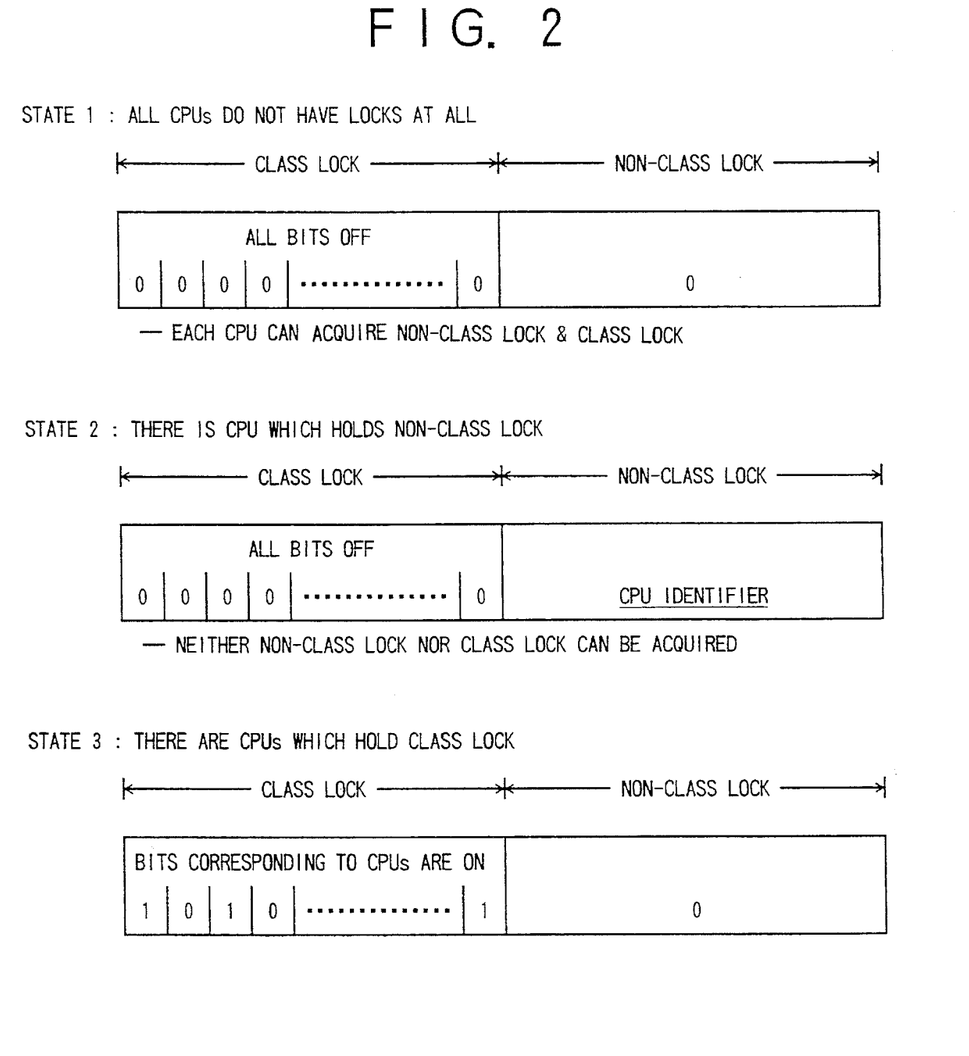
FIG. 2 is a diagram explaining the lock control information (CPU) shown in FIG. 1A.

FIG. 2 shows the contents of the lock control information (CPU) 1, in which three states of the lock control information (CPU) 1 are illustrated. In state 1, none of the CPUs have locks and all bits in the class lock area are "0", while the non-class lock area has "0" (which means that no CPU identifier is written into the non-class lock area). In state 2, there is a CPU which has acquired the non-class lock. In state 2, all the bits in the class lock area are "0" and the identifier of the above CPU is written into the non-class lock area. The CPU having the CPU identifier written into the non-class lock area has acquired the whole exclusion, and the non-class lock and the class lock cannot be acquired at all. In state 3, there are CPUs which have acquired the class lock. In state 3 shown in FIG. 2, CPU #0, CPU #2 and CPU #15 have acquired the class lock, and the non-class lock cannot be acquired.

Figure 3A:
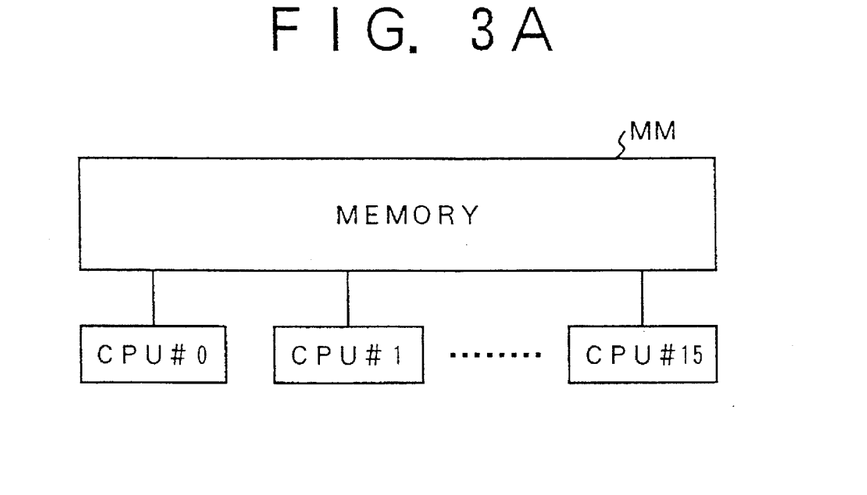
FIG. 3A is a block diagram of a system according to the embodiment of the present invention.
Figure 3B:
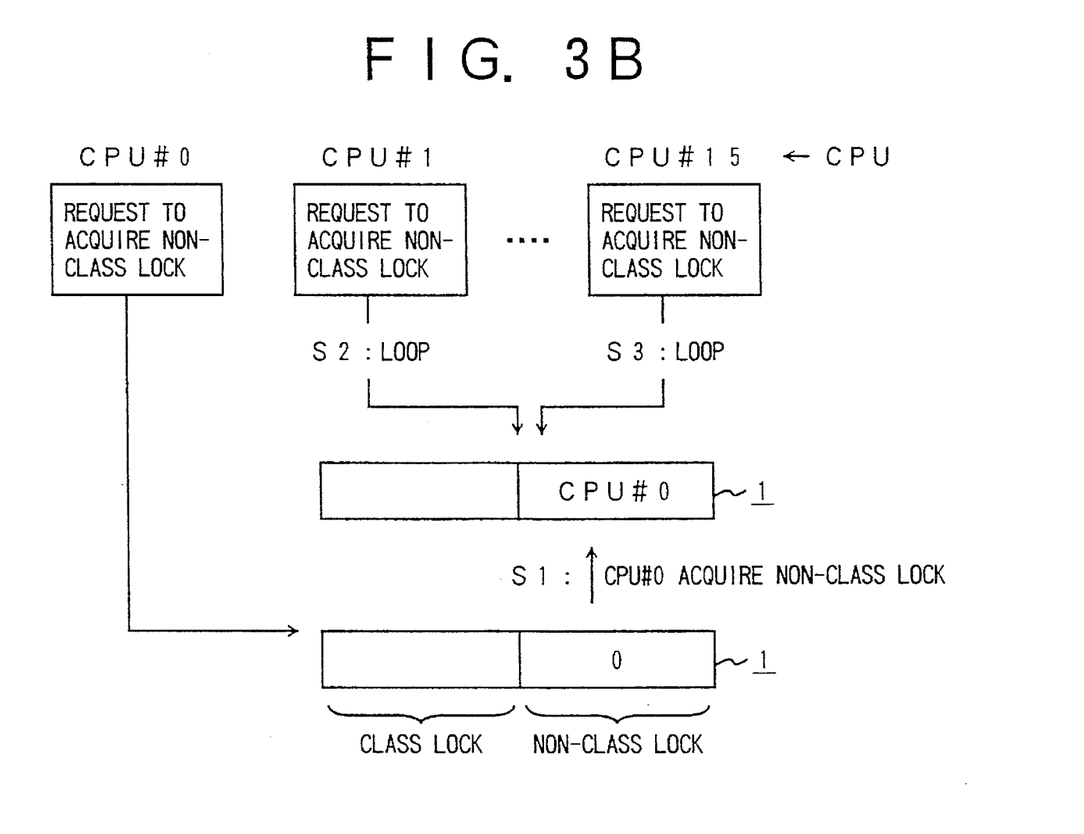
FIG. 3B is a diagram of the operation of the embodiment of the present invention.

FIG. 3A shows a system having CPUs #0–CPU #15 and a memory unit MM connected thereto. FIG. 3B shows an operation of the system when CPU #0 acquires the non-class clock. The memory unit MM stores the lock control information (CPU) 1 and the lock control information (resource) 2. In FIG. 3B, CPU #0 requests to acquire the non-class lock in step S1 with respect to the memory unit MM. In FIG. 3B, all the bits of the class lock area and the non-class lock area of the lock control information held in the memory unit MM are "0". Accordingly, the CPUs #0–#15 have not acquired the class lock and the non-class lock at all. Therefore, the identifier of CPU #0 is written into the non-class lock area, whereby the whole exclusion can be acquired.

In step S2, CPU #1 requests to acquire the non-class clock. However, there is the identifier of CPU #0 in the non-class lock area of the lock control information (CPU) 1. Hence, the request from CPU #1 is kept waiting (loop sequence) until the CPU identifier is deleted from the non-class lock area and the whole exclusion is released. In step S3, CPU #15 requests to acquire the class lock. However, there is the identifier of CPU #0 in the non-class lock area of the lock control information (CPU) 1. Hence, the request from CPU #15 is kept waiting (loop sequence) until the CPU identifier is deleted from the non-class lock area (further the identifier of CPU #1 requesting the non-class lock), and the whole exclusion is released.

Figure 4:
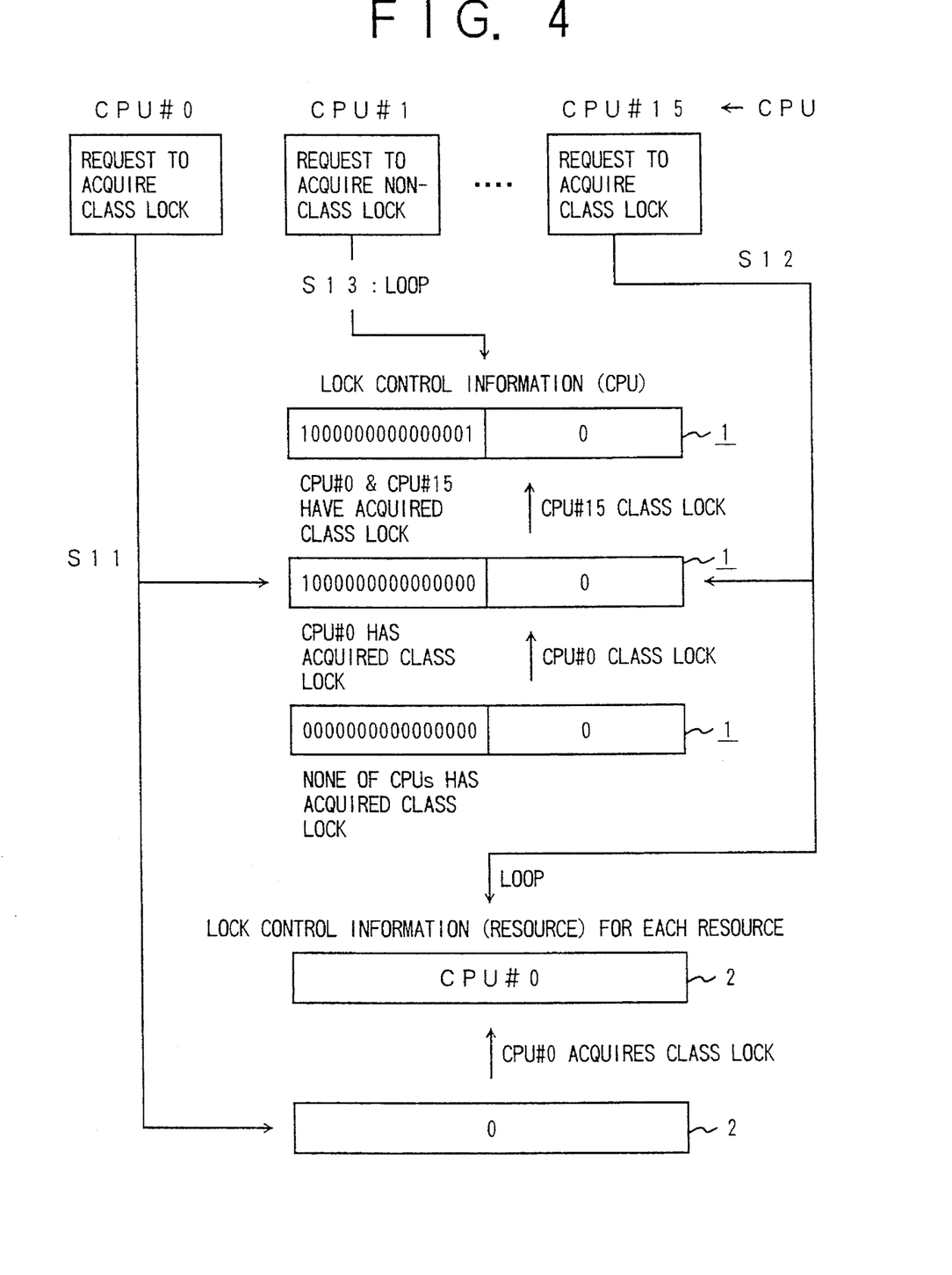
FIG. 4 is a sequence diagram of the operation of the embodiment of the present invention.

FIG. 4 is a flowchart of the operation of the system shown in FIG. 3A which has 16 CPUs #0–#15. More particularly, the operation shown in FIG. 4 relates to a procedure for acquiring the class lock. In step S11, CPU #0 requests to acquire the class lock. In this case, the non-class lock area of the lock control information (CPU) 1 has "0" and has not been locked. Thus, bit "1" is written into the corresponding position in the class lock area of the lock control information (CPU) 1, whereby CPU #0 acquires the class lock. In FIG. 4, the lock control information (resource) 2 defined for each resources classified has "0" and has not been locked. Hence, the identifier of CPU #0 is written into the lock control information 2. In the above manner, CPU #0 has acquired exclusive use of the classified resource.

In step S12 subsequent to step S11, CPU #15 requests to acquire the same class lock. In this case, the non-class lock area of the lock control information (CPU) 1 has data "0" and none of the CPUs #0–#15 have acquired the non-class lock. Hence, the bit in the class lock area corresponding to CPU #15 is changed to "1", so that the class lock can be acquired by CPU #15. However, the lock control information (resource) 2 concerning each resource classified is locked by CPU #0. Hence, CPU #15 is kept waiting (loop sequence) until the identifier of CPU #0 is deleted from the lock control information (resource) 2. When the identifier of CPU #0 is deleted from the lock control information (resource) 2, CPU #15 is allowed to acquire the lock.

In step S13 subsequent to step S12, CPU #1 requests to acquire the non-class lock. In this case, since CPU #0 and CPU #15 have acquired the class locks (the corresponding bits in the class lock area of the lock control information 1 are "1"), CPU #1 is kept waiting until all the class locks relating to CPU #0 and CPU #15 are released (the corresponding bits are changed to "0").

Figure 5:
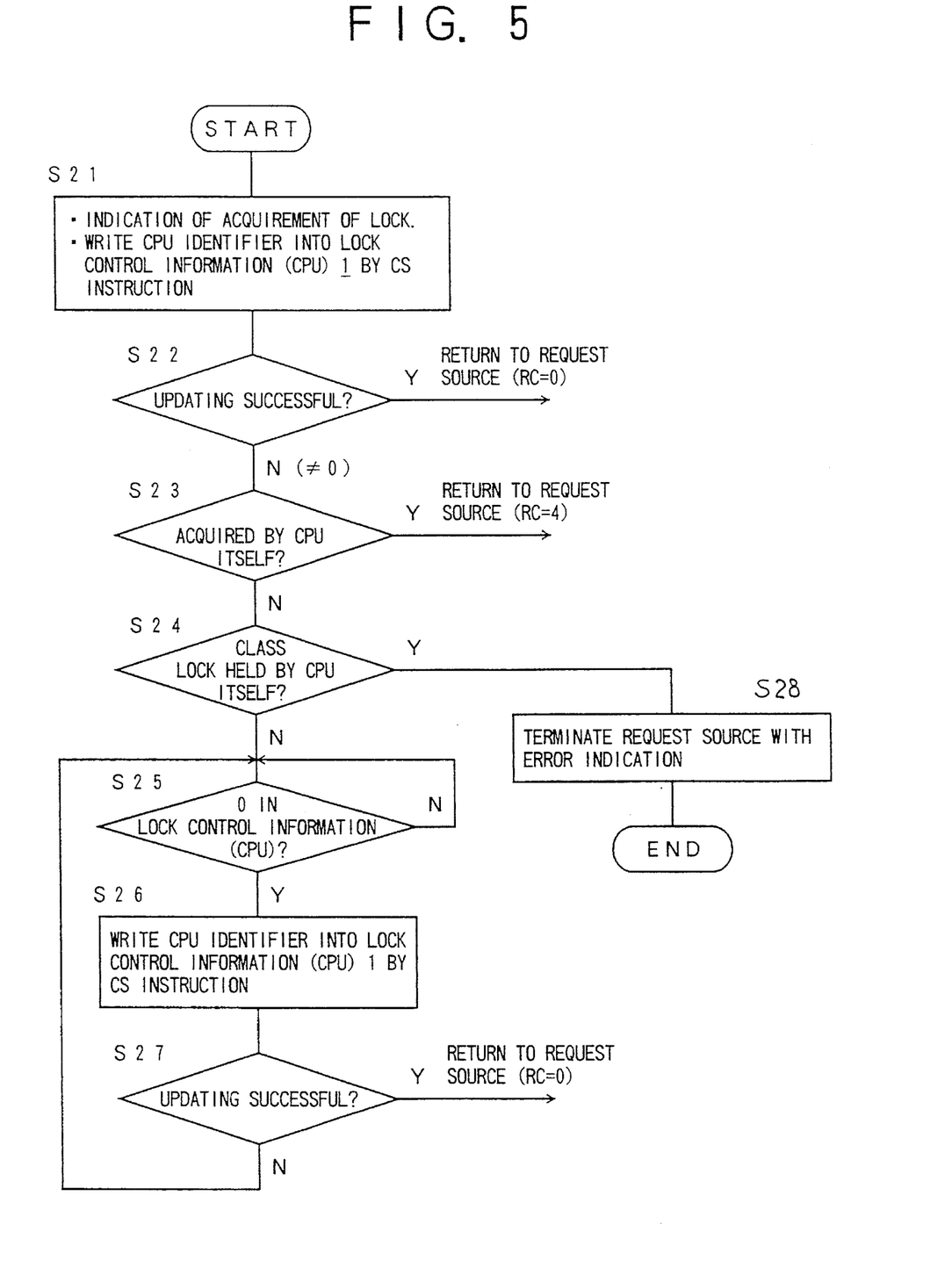
FIG. 5 is a flowchart of a process for acquiring a non-class lock according to the embodiment of the present invention.

A description will now be given of a process for acquiring the non-class lock by a sequence shown in FIG. 5. In step S21, a CPU indicates acquirement of the lock. The CPU attempts to write the CPU identifier assigned thereto into the lock control information (CPU) 1 by using the compare and swap (CS) instruction. In step S22, the CPU determines whether or not the compare and swap instruction is accepted. The compare and swap instruction is an instruction in which exclusion of the other CPUs is ensured by hardware. The result of the determination in step S22 is YES when there is "0" in the non-class lock area of the lock control information 1 and there are no identifiers of the CPUs except for the CPU being considered. In this case, the CPU being considered succeeds to write its own CPU identifier into the non-class lock area of the lock control information 1. Then, the process returns to a source that generated the request for acquirement of the non-class lock by setting a return code (RC) to 0. If the result of the step S22 determination is NO, the CPU being considered makes a decision that the identifier of CPU has been written into the non-class lock area of the lock control information 1, and step S23 is carried out.

In step S23, the CPU determines whether or not the non-class lock has been acquired to itself. If the result of step S23 is YES, the CPU has acquired the non-class lock, and the process returns to a source that generated the request for acquirement of the non-class lock by setting the return code RC to 4. If the result of step S23 is NO, the CPU concludes that the CPU has not acquired the non-class lock, and performs step S24.

In step S24, the CPU determines whether or not the CPU holds the class lock to itself. When the result of step S24 is YES, the CPU ends the process with an indication of error. If the result of step S24 is NO, the CPU proceeds to step S25. In step S25, the CPU determines whether or not all the bits in the class lock area of the lock control information (CPU) 1 are "0". If the result of step S25 is YES, step S26 is carried out. If the result of step S25 is NO, the CPU waits until all the bits in the class lock area of the lock control information (CPU) 1 become "0" and the CPU is allowed to acquire the non-class lock. In step S26, the CPU writes the identifier thereof into the non-class lock area of the lock control information (CPU) 1. In step S27, the CPU determines whether or not all the bits written into the class lock area of the lock control information (CPU) 1 are "0" and whether or not the setting (updating) of the CPU identifier has succeeded. When the result of step S27 is YES, it is determined that the non-class lock had been successfully acquired, and the process returns to the request source by setting the return code RC to zero. When the result of step S27 is NO, the process returns to step S25.

As described above, in response to the request to acquire the non-class lock, by the CS instruction, the non-class lock can be acquired and the process returns to the request source when all the bits in the class lock area and the non-class lock area of the lock control information (CPU) 1 are "0" and the setting of the CPU identifier can be successfully carried out. On the other hand, when all the bits in the lock control information (CPU) 1 are not "0", the CPU that requests the acquirement of the non-class lock waits until all the bits become "0". At this time, the non-class lock can be acquired and the process returns to the request source. In the above manner, it becomes possible to acquire the non-class lock for the lock control information (CPU) 1 and to exclusively access the resource to carry out a process.

Figure 6:
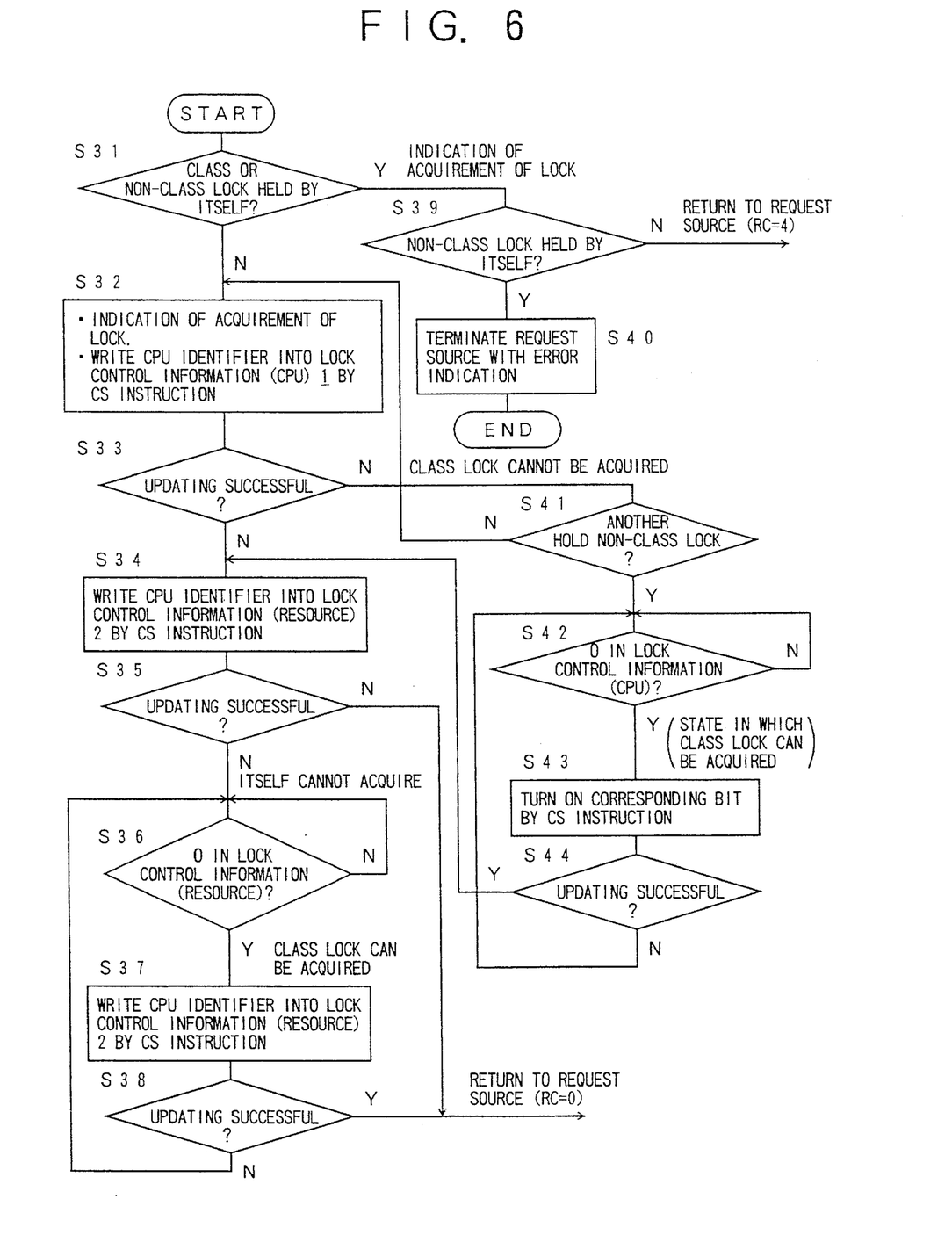

A description will now be given of a process for acquiring the class lock in a sequence shown in FIG. 6. In step S31, a CPU determines whether or not the CPU holds either the class lock or the non-class lock to itself. When the result of step S31 is YES, the CPU determines, in step S39, whether or not the CPU holds the non-class lock. When the result of step S39 is YES, the CPU terminates the request source with an indication of error in step S40. When the result of step S39 is NO, the CPU determines that the CPU holds the class lock and the process returns to the request source by setting the return code RC to 4. When it is determined, in step S31, that the CPU has neither the class lock or the non-class lock, the CPU proceeds to step S32.

In step S32, the CPU carries out an indication of acquirement of the lock, and attempts to switch the corresponding bit in the class lock area of the lock control information (CPU) 1 to "1" (ON) by using the CS instruction. In step S33, the CPU determines whether or not the updating (setting) by the CS instruction has succeeded. When the result of step S33 is YES, the corresponding bit in the class lock area of the lock control information (CPU) 1 has been successively changed to "1" and the CPU proceeds to step S34. When the result of step S33 is NO, the CPU concludes that another CPU holds the non-class lock in the lock control information (CPU) 1 and the acquirement of the class lock has failed. In this case, step S41 is carried out.

In step S34, using the CS instruction, the CPU writes the CPU identifier thereof in the lock control information (resource) 2 provided for each resource. In step S35, the CPU determines whether or not step S34 has been successfully carried out. When the result of step S35 is YES, the CPU determines that the CPU identifier thereof has been successfully written into the lock control information (resource) 2 and that the class lock has been acquired. Then, the process returns to the request source by setting the return code RC to 0. When the result of step S35 is NO, the CPU determines that the CPU has failed to write the CPU identifier thereof into the lock control information (resource) 2 and failed to acquire the class lock. Then, step S36 is carried out.

In step S36, the CPU determines whether or not the lock control information for each resource has "0". When the result of step S36 is YES, the CPU determines that the class lock for the lock control information (resource) 2 for each resource can be acquired and executes step S37. When the result of step S36 is NO, the CPU waits until it becomes possible to acquire the class lock.

In step S37, the CPU attempts to write the CPU identifier thereof into the lock control information (resource) 2 for each resource by the CS instruction. In step S38, the CPU determines whether or not step S37 has succeeded. When the result of step S38 is YES, the CPU determines that the setting of the CPU identifier thereof in the lock control information (resource) 2 has been successfully carried out and the class lock has been acquired, and the process returns to the request source by setting the return code RC to 0. When the result of step S38 is NO, the CPU determines that the CPU has failed to write the CPU identifier thereof into the lock control information (resource) 2 and failed to acquire the class lock. In this case, the process returns to step S36.

In step S41, the CPU determines whether or not another CPU holds the non-class lock. When the result of step S41 is YES, the process of the CPU proceeds to step S42. When the result of step S41 is NO, the process returns to step S32. In step S42, the CPU determines whether or not the corresponding bit in the lock control information (CPU) 1 is "0". When the result of step S42 is YES, the CPU determines that the class lock can be acquired and executes step S43. When the result of step S42 is NO, the CPU waits.

In step S43, the CPU attempts to switch the corresponding bit in the lock control information (CPU) 1 to "1" by the CS instruction. In step S44, the CPU determines whether or not step S43 has been successfully performed. When the result of step S44 is YES, the process returns to step S34 at which the CPU writes the CPU identifier thereof into the lock control information (resource) 2 for each resource by the CS instruction, so that the class lock can be acquired. When the result of step S44 is NO, process returns to step S42.

In the above manner, when the non-class lock for the lock control information (CPU) 1 has not been held, the CPU writes the corresponding bit in the lock control information (CPU) 1 into "1", and thereafter writes the CPU identifier thereof into the lock control information (resource) 2 for each resource, whereby the class lock can be acquired.

Figure 7:
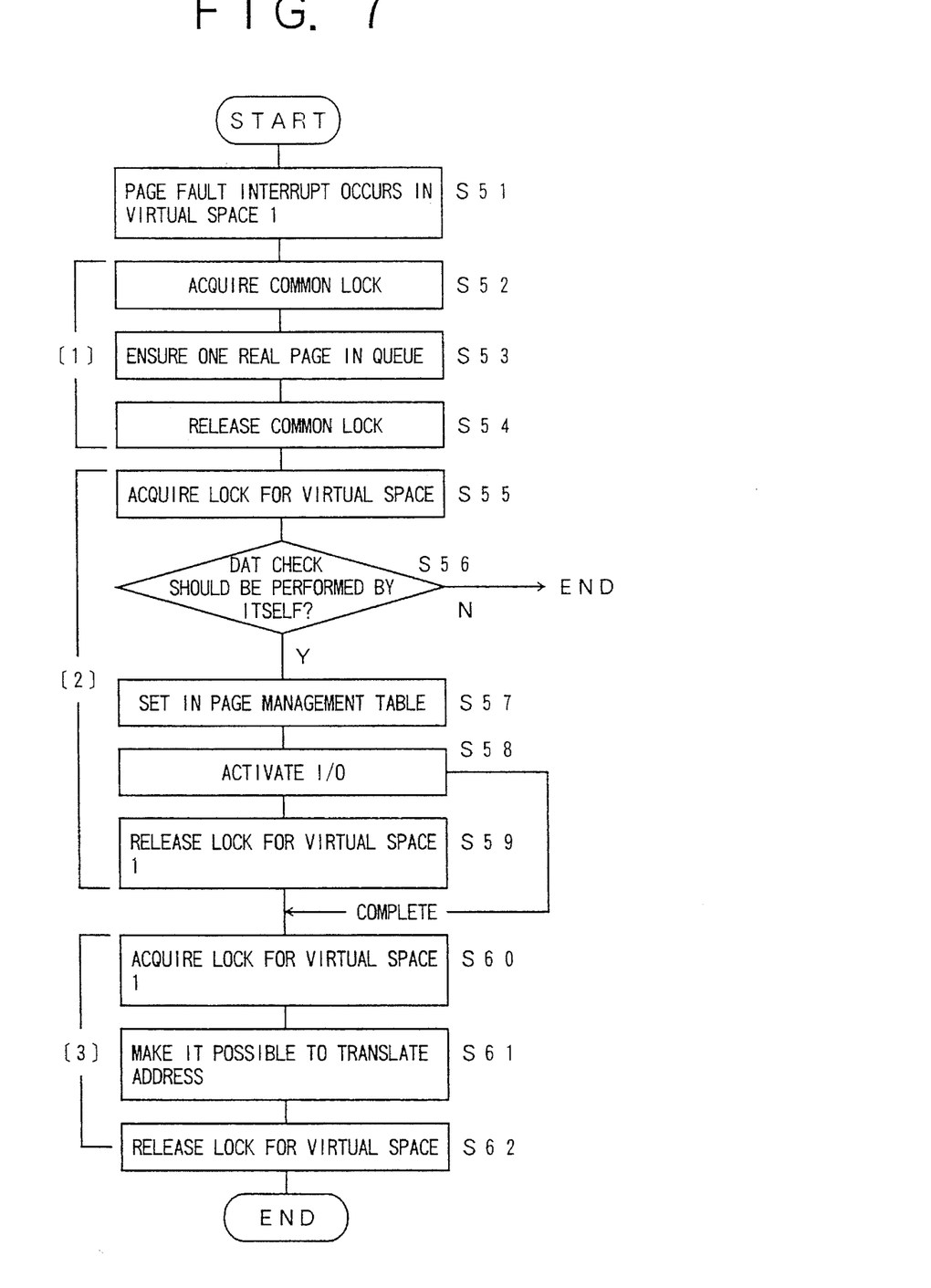
FIG. 7 is a flowchart of a process of an application using the present invention and FIGS. 8A, 8B and 8C are diagrams of the application shown in FIG. 7.

A description will now be given of an application of the present invention shown in FIGS. 8A, 8B and 8C which is processed in a sequence shown in FIG. 7. FIG. 7 is a flowchart of a process in which a page fault has occurred in a virtual space, a real page is captured by a common lock (non-class lock) and is set in a page management table by a lock (class lock) of a virtual space 1 shown in FIG. 8A.

Figure 8A:
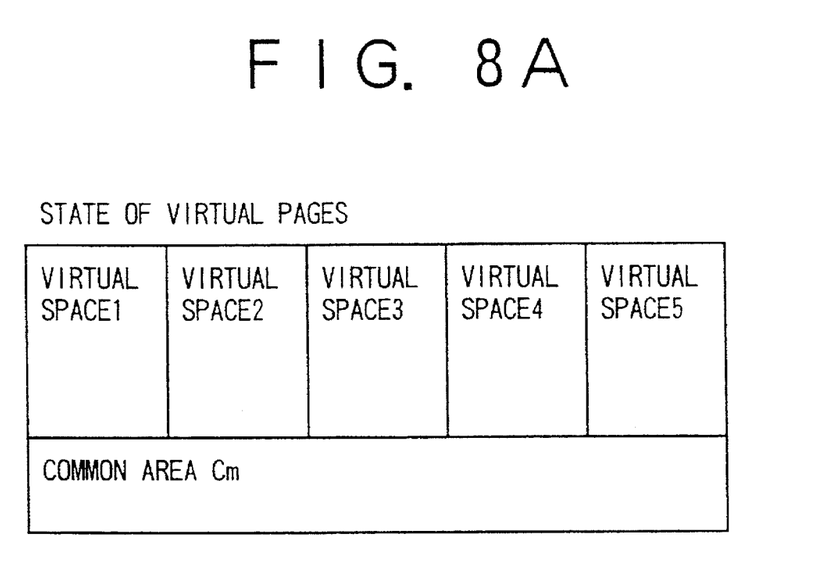
Figure 8B:
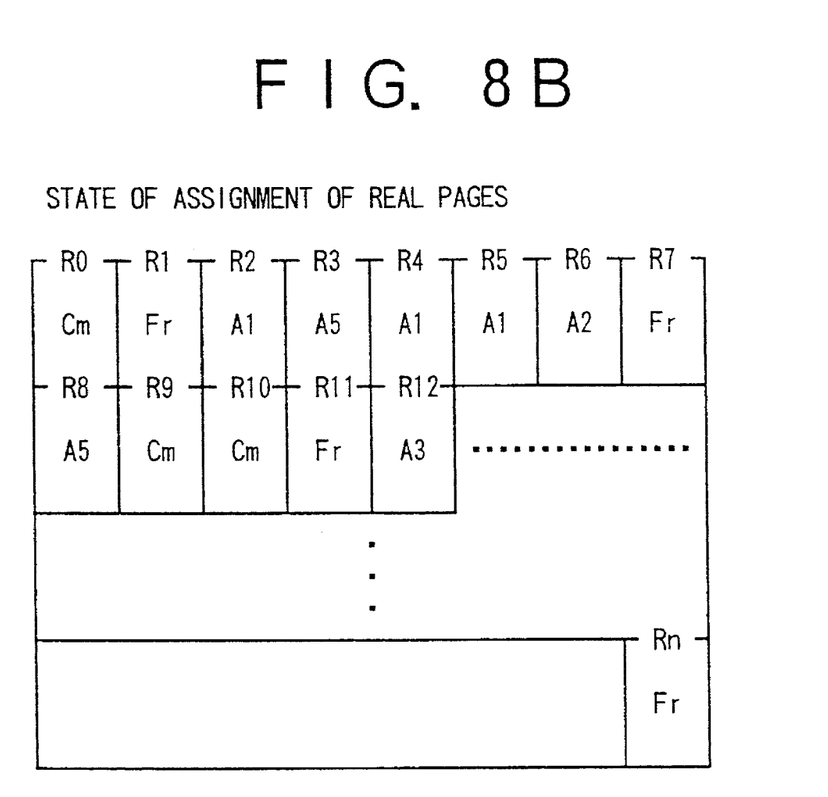

In step S51 shown in FIG. 7, a page fault interrupt occurs in the virtual space 1 shown in FIG. 8A, which shows the state of virtual pages. In step S52, the common lock (the lock for the whole system, non-class lock) is acquired. Step S52 is performed by acquiring the non-class lock in the lock control information (CPU) 1 in the same manner as has been described previously. In step S53, the CPU being considered acquires one real page in a queue of usable real pages shown in FIG. 8C. In FIG. 8C, there are a plurality of available real pages R1, R7, R11, . . . , Rn (n is an integer) in the queue. In step S54, the CPU releases the common lock. In the state in which the common lock has been acquired by the steps S52–S54 (that is, the common lock for a common area Cm shown in FIG. 8A is held), one real page is captured from the queue, and thereafter the common lock is released. Hence, it becomes possible to minimize the interval during which the common lock (non-class lock) is held (indicated by [1] shown in FIG. 7) and greatly reduce collisions against other CPUs.

In step S55, the CPU acquires the lock for the virtual space 1. Since the real page has been acquired by the steps S52 through S54, the lock for the virtual space 1 (the lock for the lock control information (resource) 2) is acquired as the next step. In step S56, the CPU refers to a dynamic address translation table (DAT) and determines whether or not the subsequent process should be carried out by the CPU itself. When the result of step S56 is YES, the CPU executes step S57. When the result of step S56 is NO, the process is ended because another CPU should perform a process.

In step S57, the CPU registers the name of an owner in the corresponding page of the page management table. This is done by adding the real page to a queue of real pages using the virtual space 1 in a real page management table shown in FIG. 8C. In step S58, the CPU activates an I/O process for the external storage → real page translation, and writes information indicating that the I/O process is being performed into the dynamic address translation table DAT. In step S59, the CPU releases the lock for the virtual space 1.

Figure 8C:
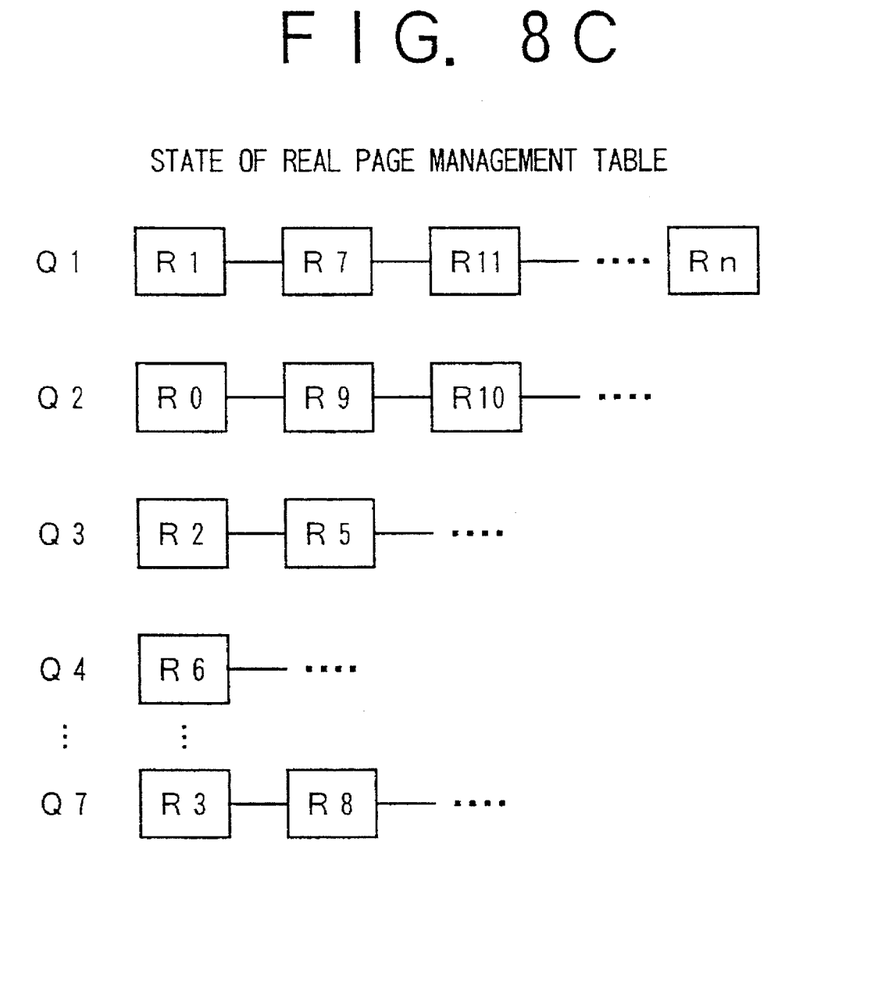

By the steps 55 through S59, in the state in which the lock for the virtual space 1 has been acquired (acquirement of the lock for the lock control information (resource) 2 for each resource), the real page is added to the queue of real pages using the virtual space 1 in the real page management table shown in FIG. 8C whereby the real page is assigned and the I/O process is activated.

In step S60, in response to completion of the I/O process activated in step S58, the CPU acquires the lock for the virtual space 1. In step S61, the CPU sets information indicating the "virtual" → "real" translation in the DAT, so that the virtual address can be translated into the real address. In step S62, the CPU releases the virtual space 1 from the locked state.

Hence, it becomes possible to acquire the class lock only when it is needed by a sequence [2] shown in FIG. 7 and to ensure minimum necessary exclusion and reduce collisions against other CPUs.

It will be noted that the sequence [1] shown in FIG. 7 indicates the range of the serializing process based on the non-class lock, and the sequence [2] indicates the range of the serializing process based on the class lock. By the class lock, it becomes possible to achieve serializing of other execution units in the same space and serializing of other real pages in the system to be supplied (checking of real pages that have not been referred to for a long time and outputting to an external storage).

Referring to FIG. 8A, the state of virtual pages includes virtual spaces 1, 2, 3, 4 and 5 and the common area Cm. FIG. 8B shows an assignment of real pages R0, R1 . . . . , Rn. A reference Fr denotes a usable state, and Cm denotes that the corresponding real page is in use as the common area. A reference A1 denotes that the corresponding real page is used in the virtual space 1, and A5 denotes that the corresponding real page is used in the virtual space 5.

FIG. 8C shows the state of the real page management table. A queue Q1 denotes a queue in which usable real pages are chained. In FIG. 8C, real pages R1, R7, R11, . . . , Rn are chained in the queue Q1, and correspond to the real pages to which Fr is given as shown in FIG. 8B. A queue Q2 denotes a queue in which real pages that are in use in the common area Cm are chained. In FIG. 8C, real pages R0, R9, R10 . . . are chained in the queue Q2, and correspond to the real pages to which Cm is given as shown in FIG. 8B. A queue Q3 denotes a queue in which real pages that are in use in the virtual space 1 are chained. In FIG. 8C, real pages R2, R5 . . . are chained in the queue Q3 and correspond to the real pages to which A1 is given as shown in FIG. 8B. A queue Q4 denotes a queue in which real pages that are in use in the virtual space 2 are chained. In FIG. 8C, real pages R6 . . . are chained in the queue Q4, and correspond to the real pages to which A2 is given. A queue Q7 denotes a queue in which real pages that are in use in the virtual space 5 are chained. In FIG. 8C, real pages R3, R8 . . . are chained in the queue Q7, and correspond to the real pages to which A5 is given as shown in FIG. 8B.

In short, according to the present invention, the exclusion of the whole system can be acquired by writing the CPU identifier (or the bit corresponding to a CPU that requests the non-class lock) into the non-class lock area of the lock control information (CPU) 1 when there is no CPU identifier (or the bits corresponding to the CPUs) in the lock control information (CPU) 1. Further, exclusion based on the class lock can be acquired by writing the CPU identifier (or the bit corresponding to a CPU which requests the class lock) in the class lock area of the lock control information (CPU) 1 and thereafter writing the CPU identifier (or the bit corresponding to the CPU) into the lock control information (resource) 2) when there is no CPU identifier in the non-class lock area of the lock control information (CPU) 1. As a result, it becomes possible to satisfy both the serializing request based on the non-class lock with respect to the whole resource and the serializing request based on the class lock with respect to the classified resources (classes) and to thereby suppress unnecessary collisions among CPUs that occur in the serializing process for the resource. Hence, the parallel-process performance of CPUs and the processing ability of the whole computer system can be improved.

The present invention is not limited to the specifically disclosed embodiments, and variations and modifications may be made without departing from the scope of the present invention.

What is claimed is:

1. A lock control method for a system having a plurality of processors (CPUs), a memory, and a resource, said lock control method comprising the steps of:

(a) writing by the CPUs identification information concerning the CPUs into a first lock control information area of the memory when each of the CPUs acquires one of a class lock and a non-class lock for the resource classified into classes corresponding to whether one of the CPUs has acquired one of the class lock and the non-class lock, said first lock control information area having a class lock area and a non-class lock area, said non-class lock area being used to access serially the resource by the CPUs, said class lock area being used to access classes of the resource;

(b) writing by the CPUs the identification information indicating the CPUs into a second control information area of the memory when each of the CPUs acquires locks for the classes;

(c) writing the identification information concerning one of the CPUs into the non-class lock area of the first lock control information area when the one of the CPUs determines there is no identification information in the first lock control information area, so that said one of the CPUs can acquire the right to exclusively use the resource; and (d) writing the identification information concerning one of the CPUs into the class lock area of the first lock control information area and writing the identification information concerning said one of the CPUs into the second lock control information area when the one of the CPUs determines there is no identification information in the non-class lock area of the first lock control information area, so that said one of the CPUs can acquire the right to exclusively use the resource for each of the classes.

2. The lock control method as claimed in claim 1, wherein:

the step (c) comprises the step of determining by the one of the CPUs whether there is identification information in the first lock control information area by using a compare and swap instruction; and the step (d) comprises the step of determining by the one of the CPUs whether there is identification information in the non-class lock area of the first lock control information area by using the compare and swap instruction.

3. The lock control method as claimed in claim 1, wherein the step (d) comprises the steps of:

(d-1) determining by the one of the CPUs whether there is identification information in the non-class lock area of the first lock control information by using a compare and swap instruction; and (d-2) causing the step (d) to write the identification information concerning the one of the CPUs into the class lock area of the first lock control information area and to write the identification information concerning said one of the CPUs into the second lock control information area after the identification information is deleted from the non-class lock area of the first lock control information area when the one of the CPUs determines in the step (d-1) that there is identification information in the non-class lock area of the first lock control information.

4. The lock control method as claimed in claim 1, wherein:

the class lock control area of the first lock control information area comprises bits respectively corresponding to the CPUs; and the step (d) comprises the step of changing one of the bits corresponding to said one of the CPUs from a first value to a second value.

5. The lock control method as claimed in claim 1, wherein the second lock control information area is provided for each of the classes of the resource.

6. A lock control method for a system comprising a plurality of processors (CPUs), a memory and a resource, said lock control method comprising the steps of:

(a) performing a first write operation to the memory by the CPUs, said memory having a first lock control area and a second lock control area, said first lock control area comprising a class lock area and a non-class lock area, said non-class lock area being used to access serially the resource by the CPUs, said class lock area being used to access classes of the resource, which are parts of the resource, said first write operation comprising a step of writing identification information of the CPUs into the non-class lock area when the CPUs acquire a non-class lock and another step of writing the identification information of the CPUs into the class lock area when the CPUs acquire a class lock;

(b) performing a second write operation to the memory by the CPUs so that the identification information of the CPUs is written into the second lock area to acquire a right to access the classes of the resources;

(c) performing a first acquiring operation to the resource by the CPUs so that one of the CPUs is allowed to acquire the non-class lock by writing the identification information into the first lock control area only when no CPU has acquired the non-class lock or the class lock, whereby said one of the CPUs that acquires the non-class lock has the right to access exclusively the resource; and (d) performing a second acquiring operation on the resource by the CPUs so that each of the CPUs is allowed to acquire the class lock by writing the identification information into the class lock area of the first lock control area as well as the second lock control area when no CPU has the non-class lock or the class lock for each of the classes, whereby each of the CPUs that acquires the class lock has the right to access the resource for the acquired class.

* * * * *